United States Patent [19]

Price et al.

[11] 4,218,411

[45] Aug. 19, 1980

[54] METHOD AND APPARATUS FOR PRODUCING PARTICULATE SULFUR

[76] Inventors: Harold A. Price, 1604 N. Shaffer, Orange, Calif. 92667; F. Everett Wingate, 4791 E. Date, Fresno, Calif. 93725

[21] Appl. No.: 24,009

[22] Filed: Mar. 26, 1979

Related U.S. Application Data

[63] Continuation of Ser. No. 683,022, May 4, 1976, abandoned, and a continuation-in-part of Ser. No. 561,937, Mar. 25, 1975, abandoned.

[51] Int. Cl.² ............................................. B01J 2/04
[52] U.S. Cl. ......................................... 264/8; 264/14
[58] Field of Search ............................... 264/12, 14, 8

[56] References Cited

U.S. PATENT DOCUMENTS

| | | | |
|---|---|---|---|
| 3,466,352 | 9/1969 | Corbett | 264/8 |
| 3,634,055 | 1/1972 | Paymal | 264/8 |
| 4,024,210 | 5/1977 | Chalmers | 264/11 |
| 4,031,174 | 6/1977 | Bennett | 264/14 |

Primary Examiner—Donald J. Arnold
Assistant Examiner—James R. Hall
Attorney, Agent, or Firm—Christie, Parker & Hale

[57] ABSTRACT

Molten sulfur is fed at a controlled flow rate into a spinning vessel located in an enclosure. Air is supplied to the enclosure by an evaporative cooler. A ring of sulfur ejecting nozzles each have an inlet communicating with the periphery of the vessel interior and an outlet communicating with the air in the enclosure. The molten sulfur is fed to the vessel at a rate lower than its discharge capacity. The sulfur is ejected from the nozzles at a temperature providing low viscosity directly into a cooling zone where its viscosity is rapidly increased and subsequently is atomized and cooled by fans on both sides of the ring of nozzles into which water is sprayed to form solid particles before appreciable agglomeration of the solid particle takes place. The solid particles are removed from the enclosure in a mixture with a substantial quantity of water saturated air, and then separated from the air by a centrifugal separator.

1 Claim, 3 Drawing Figures

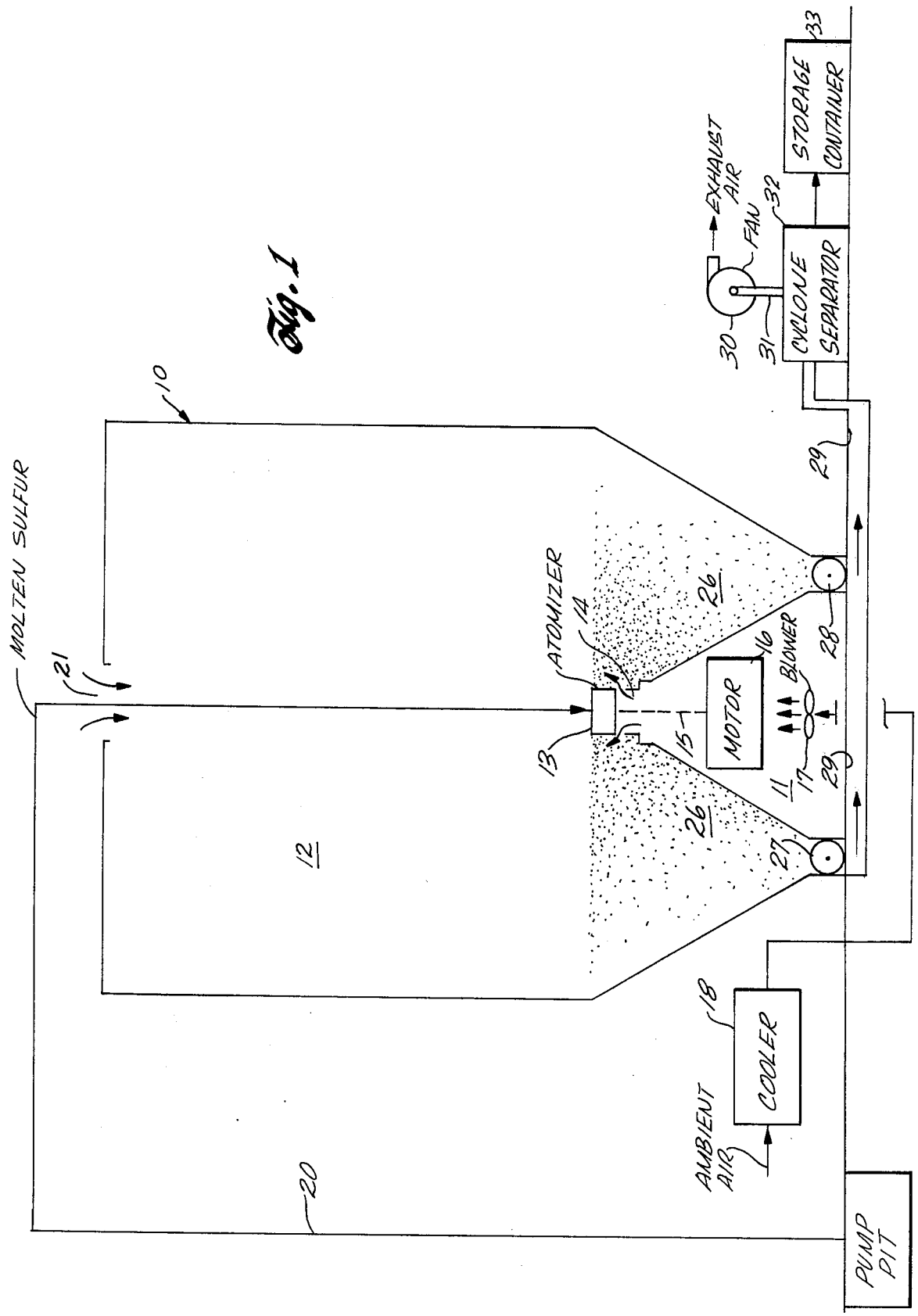

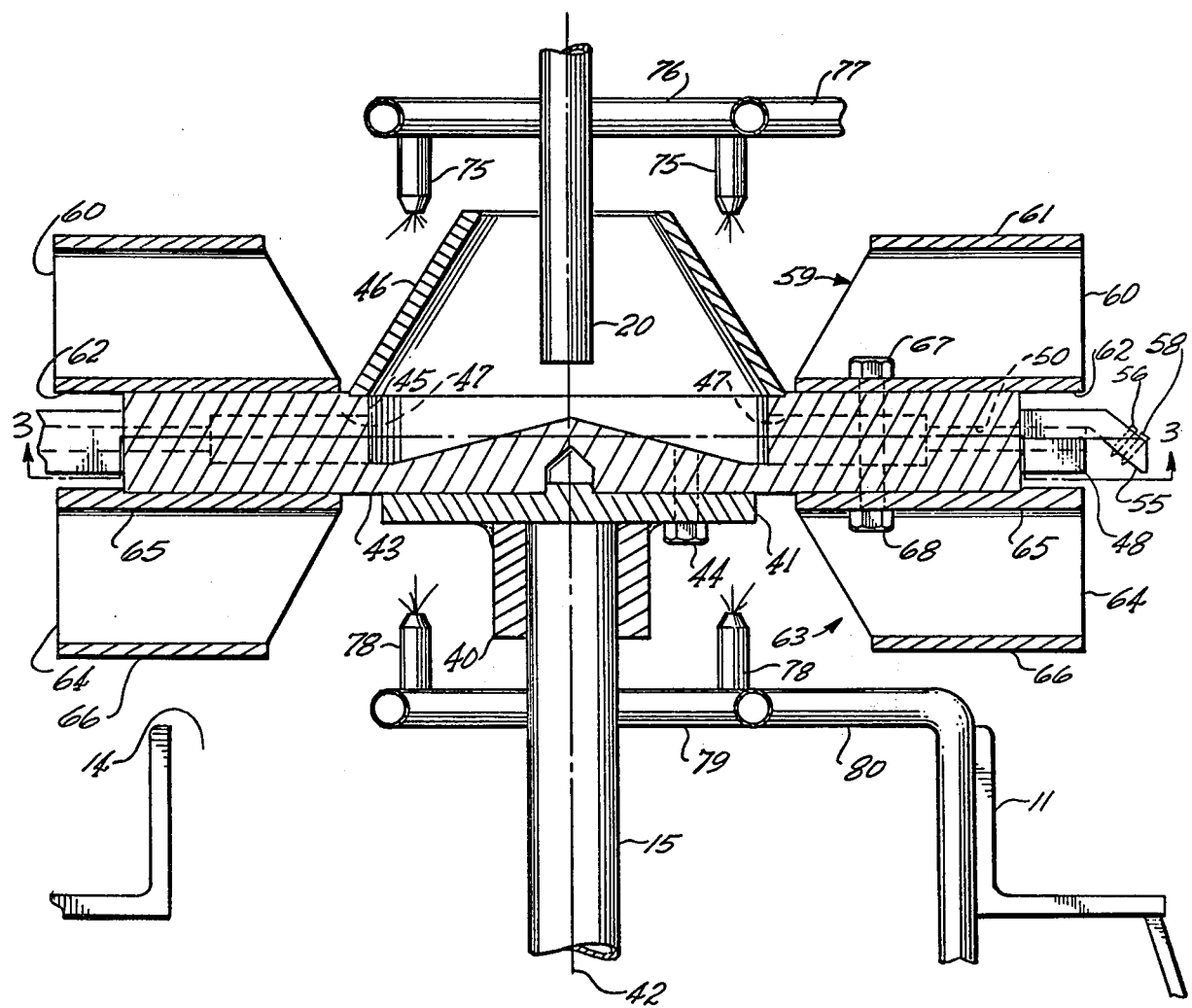

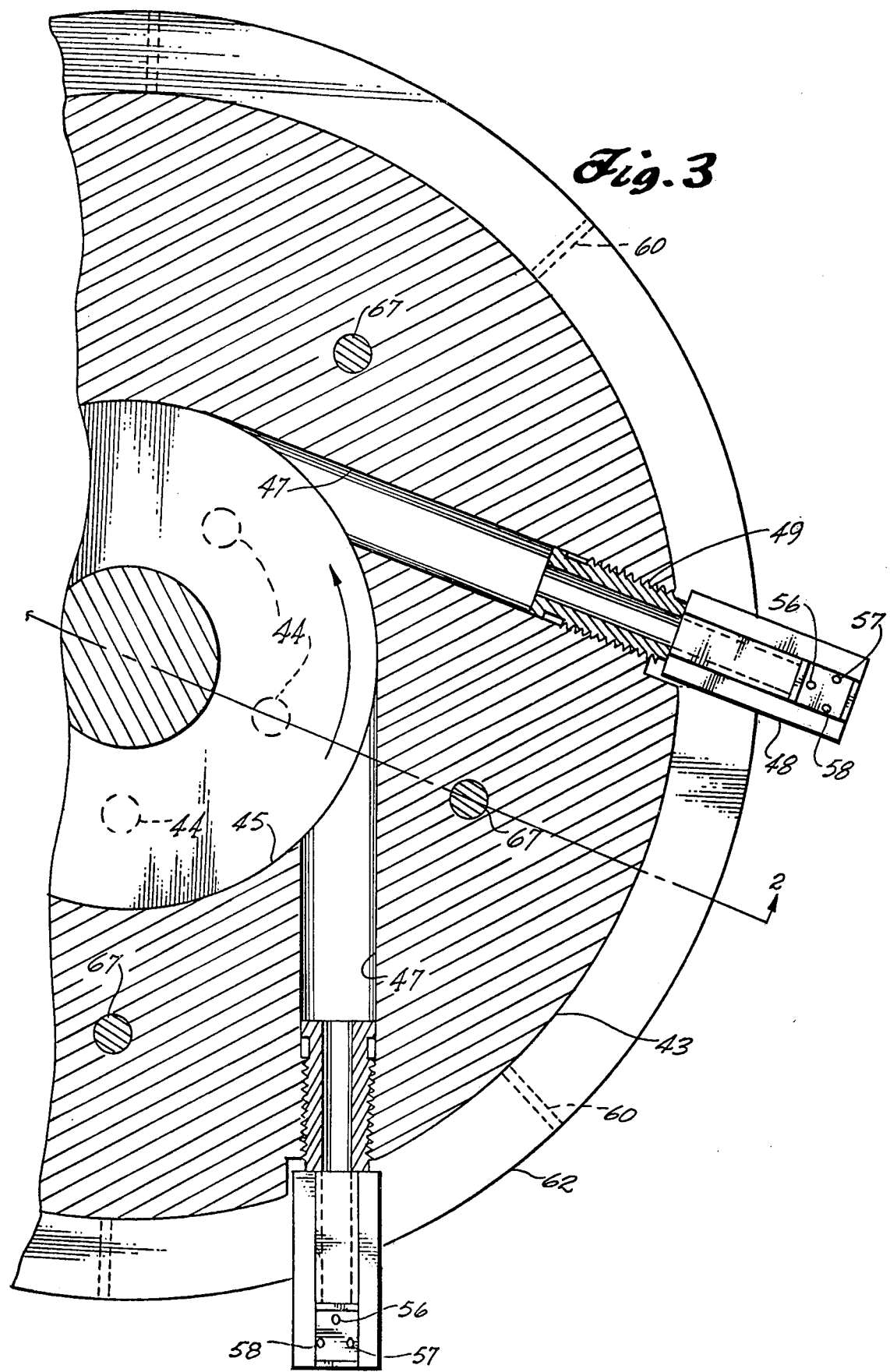

METHOD AND APPARATUS FOR PRODUCING PARTICULATE SULFUR

CROSS REFERENCE TO RELATED APPLICATIONS

This is a continuation of application Ser. No. 683,022, filed May 4, 1976, now abandoned which is a continuation-in-part of application Ser. No. 561,937, filed Mar. 25, 1975 now abandoned.

BACKGROUND OF THE INVENTION

This invention relates to the production of particulate sulfur and, more particularly, to a method and apparatus for transforming molten sulfur into solid particles of controlled size.

Solid particulate sulfur has many industrial and agricultural applications. The desired particle size depends upon the particular application. For example, sulfur spread on soil by a mechanical spreader typically would have a particle size that will pass a 20 mesh Tyler screen, and sulfur employed for insecticides or rubber production typically would have a particle size that will pass a 325 mesh Tyler screen.

The conventional way to produce sulfur in particulate form is to pour molten sulfur on a concrete slab or a water cooled metal or rubber conveyor belt, thereby forming a solidified layer of sulfur, which is broken up into lumps or flakes by mechanical means such as a crusher or bucket loader. Before reducing the lumps or flakes to the desired fine particle size, they must be aged for a substantial period of time, e.g., from three to nine months, to develop a concise rhombic crystal structure that will be suitable and resist coalescing under the pressure of the mechanical milling required to produce the desired particle size.

Soil sulfur can be produced by feeding the lumps or flakes into a variety of crushers or mills. Sulfur in a form suitable for insecticides is generally produced by feeding aged sulfur particles into a roller mill. The milling operation is expensive, hazardous, and slow. To prevent explosions, the milling operation is carried out in an inert atmosphere such as combusted natural gas with an oxygen content reduced to about 3%. To prevent the particles of sulfur from coalescing due to the energy being expended, the temperature of the inert atmosphere during the milling operation must also be closely controlled by recycling through coolers and the like.

SUMMARY OF THE INVENTION

The invention is directed to a method and apparatus for producing solid particulate sulfur of controlled size from molten sulfur by a relatively inexpensive, safe, and quick technique. The sulfur is not mechanically broken up or milled, and is not aged before reduction to its desired particle size. Molten sulfur is spun to impart thereto an outward motion. The spinning sulfur is ejected at a temperature providing low viscosity directly into a cooling zone, where it is atomized and solidified before agglomeration can occur. An inert gaseous medium is not required, because there is no mechanical action to generate heat or strike a spark; hence, there is little danger of explosion. For convenience, the gaseous medium into which the molten sulfur is ejected would ordinarily be air.

According to a feature of the invention, water is injected into the cooling zone to increase the heat dissipative capacity of the gaseous medium.

According to another feature of the invention, sulfur is fed to a rotating atomizer at a rate lower than its discharge capacity; hence, air is discharged with the sulfur. As a result, smaller sulfur particles are produced for a given atomizer design and rotational speed.

According to another feature of the invention, the solid sulfur particles are carried to a bulk storage location in suspension in an air stream, to aerate and oxidize the surface of the sulfur particles, before storage.

BRIEF DESCRIPTION OF THE DRAWINGS

The features of a specific embodiment of the best mode contemplated of carrying out the invention are illustrated in the drawings, in which:

FIG. 1 is a schematic diagram of apparatus for practicing the invention, including an atomizer;

FIG. 2 is a side sectional view of the atomizer of FIG. 1 taken through the plane indicated in FIG. 3; and FIG. 3 is a bottom sectional view of the atomizer of FIG. 1 taken through the plane indicated in FIG. 2.

DETAILED DESCRIPTION OF THE SPECIFIC EMBODIMENT

In FIG. 1, an enclosure 10 has a triangular prism-shaped chamber 11 maintained at a positive pressure and an overlying larger chamber 12 maintained at a negative, i.e., subatmospheric, pressure. Enclosure 10 has straight vertical end walls in the plane of the paper, not shown in FIG. 1. Thus, the horizontal cross section of the space within chambers 11 and 12 is rectangular. An atomizer 13, described below in detail in connection with FIGS. 2 and 3, lies in chamber 12 directly above an opening 14 at the top of chamber 11. Atomizer 13 is coupled by a shaft 15 to a motor 16 located in chamber 11. A positive pressure is maintained in chamber 11 by a blower 17, which draws ambient air outside enclosure 10 through an evaporative cooler 18 into chamber 11. This air is saturated or nearly saturated with water vapor. The air in chamber 11 escapes through opening 14 into chamber 12 and serves to help cool the atomized sulfur produced by atomizer 13, in the manner described below in connection with FIGS. 2 and 3. Molten sulfur is supplied at a controlled rate to atomizer 13 from a pump pit 19 via a conduit 20, which enters chamber 12 through an opening 21 at the top of enclosure 10. Typically, molten sulfur could be gravity fed to pump pit 19 from a larger storage tank (not shown), heated to the desired temperature by steam coils in pump pit 19, and pumped through conduit 20 with a pump having a bypass to provide control of the flow rate of the molten sulfur and good turbulence within the pump pit. Typically, conduit 20 would comprise a steam traced and insulated pipe.

As atomizer 13 is rotatably driven by motor 16, the molten sulfur fed to it is outwardly thrown directly into a cooling zone, atomized, and rapidly cooled to form solid particles of controlled size, represented at 26. Two troughs are formed in chamber 12 by the upwardly converging sides of chamber 11 and the downwardly converging sides at the bottom of chamber 12. As the solid sulfur particles fall, they are directed by these troughs to screw conveyors 27 and 28 located at the bottom of chamber 12. Conveyors 27 and 28 transport the sulfur particles in the direction perpendicular to the paper to a large conduit 29 extending underneath one end of enclosure 10. A cyclone separator 32 is connected to one end of conduit 29. Air and entrained sulfur particles are drawn from the bottom of chamber 12 through conduit 29 and separator 32 by a fan 30. A conduit 31 connects fan 30 to separator 32. The air from separator 32 is discharged into the ambient air through the exhaust port of fan 30, and the particulate sulfur removed from the exhaust air by separator 32 is conveyed to a bulk storage container 33, where it is stored in bulk.

Chamber 11 provides a safe, i.e., explosion proof, environment for motor 16 and any other equipment which may generate sparks, by virtue of the cooled air circulating therein at a positive pressure, which precludes entrance of sulfur particles to chamber 11. To maintain chamber 12 at a negative pressure, which insures that no sulfur particles escape from enclosure 10, fan 30 is designed to draw more air out of chamber 12 than is drawn into chamber 11 by blower 17. Thus, in addition to the air flowing into chamber 12 through opening 14, air is drawn into chamber 12 through opening 21. Fan 30 is also designed to provide sufficient circulation to thoroughly vent chamber 12 and to insure that the sulfur particles transported in conduits 29 and 31 are entrained in enough air so the lower explosive limit is not exceeded. Assuming a production rate of 18 tons of sulfur per hour, typically air would be drawn into enclosure 10 by blower 17 at a flow rate of 5000 standard cubic feet per minute (scfm), air would be drawn into chamber 12 through opening 21 at a flow rate of 2500 scfm, and air would be drawn out of chamber 12 by fan 30 at a flow rate of 7500 scfm. Conduit 31 is sufficiently long to thoroughly mix the air and sulfur particles and to transport the sulfur particles to a location a safe distance away from enclosure 10. The solid sulfur particles are suspended in air while transported through conduit 31, which also serves to further cool the sulfur particles and to aerate the sulfur particles until their surface is oxidized, thereby eliminating surface tackiness and the propensity to collect electrical charges. Thus, the particulate sulfur product may be utilized immediately without necessity of aging and is more fluid and easier to handle and less likely to agglomerate or form lumps in storage, than sulfur produced by prior processes.

In one alternative collection system, which does not involve aeration of the solid sulfur particles, and thus may require aging of the sulfur before its utilization, the sulfur is carried from screw conveyors 27 and 28 to a sulfur stock pile by a conveyor belt, the hot air with sulfur fines is withdrawn from the top of enclosure 10, and the fines are separated from the hot air, which is exhausted into the atmosphere.

In another alternative collection system, the hot air and fines are withdrawn from the top as described in the preceding paragraph, one end of conduit 29 is open to the atmosphere, and conveyors 27 and 28 are connected to conduit 29 by rotary valves for isolation. Air from the atmosphere is drawn into the one end of conduit 29 by fan 30 to aerate the sulfur particles, which are separated from the air at the other end of conduit 29 by separator 32 in the manner shown in FIG. 1.

Reference is made to FIGS. 2 and 3 for a description of atomizer 13. The upper end of shaft 15 protrudes through opening 14 to a point spaced upwardly from chamber 11, where it fits into a collet 40, which is welded to a disc-shaped mounting plate 41. Shaft 15 rotates about an axis 42. A disc-shaped impeller 43 is secured to mounting plate 41 by a plurality (e.g., five) of bolts 44. A cavity 45 is formed in the top of impeller 43. The bottom of cavity 45 has a conical surface. The base of a hollow conical member 46 is welded to the top surface of impeller 43. Cavity 45 and member 46 define a vessel having an open top into which the end of conduit 20 protrudes. Impeller 43 has a plurality (e.g., five) of straight bores 47 arranged in a ring and extending tangentially from the periphery of cavity 45 outwardly to the periphery of impeller 43. A nozzle 48 is secured in each of bores 47 by a threaded connection at 49. As illustrated in FIG. 3, the inlet of each nozzle 48 communicates with cavity 45 via bore 47, the outlet of each nozzle 48 opens into the region surrounding impeller 43, and a passage 50 extends through each nozzle 48 from its inlet to its outlet. Each nozzle 48 has a deflector 55 at its outlet. Axially adjustable screws 56, 57, and 58 extend normally from the surface of deflector 55 into the flow path at the outlet of each nozzle 48. A fan 59 lying above impeller 43 comprises a plurality (e.g., eight) of radial blades 60 welded to annular support plates 61 and 62. A fan lying below impeller 43 comprises a plurality (e.g., eight) of radial blades 64 welded to annular support plates 65 and 66. Fans 59 and 63 are secured to impeller 43 by a plurality (e.g. five) of bolts 67 and nuts 68, which clamp plates 62 and 65 to the side surfaces of impeller 43. Thus, all the parts of atomizer 13 are integral with each other and rotate with shaft 15.

Water is sprayed downwardly into the interior of fan 59 by a plurality of downwardly directed nozzles 75 distributed around a stationary feed ring 76, which surrounds conduit 20 above member 46. Water is fed to ring 76 through a pipe 77. Water is also sprayed upwardly into the interior of fan 63 by a plurality of nozzles 78 distributed around a stationary feed ring 79, which surrounds shaft 15. Water is fed to ring 79 through a pipe 80, which leads therefrom to a water main in the interior of chamber 11. Pipe 77 could also lead to the water main in the interior of chamber 11.

The parts of atomizer 13, including plate 41, impeller 43, member 46, and fans 59 and 63, as well as conduit 20, are coaxial with axis 42. Motor 16 drives shaft 15, so as to spin impeller 43 in a counterclockwise direction, as viewed in FIG. 3. Molten sulfur is supplied to the vessel defined by cavity 45 and member 46 at a controlled rate, vis-a-vis, the angular velocity of impeller 43. The sulfur leaving conduit 20 flows outwardly in cavity 45 under the influence of the centrifugal force, aided by the conical bottom of cavity 45. Conduit 20 extends into the vessel far enough so the sulfur does not fly out as impeller 43 rotates. As the sulfur is spun by the rotation of impeller 43, it flows outwardly through bores 47 to the outlets of nozzles 48, where it is ejected into the air in the region surrounding atomizer 13.

Impeller 43 functions as the impeller of a centrifugal pump in imparting energy to the molten sulfur. However, in the preferred embodiment of the invention, the molten sulfur is supplied to impeller 43 at a controlled rate that is substantially lower than its maximum capacity to discharge molten sulfur as a centrifugal pump at the particular angular velocity and for the particular dimensions of impeller 43. Typically, the molten sulfur would be fed to impeller 43 at a rate of 20% to 40% of the maximum discharge capacity of impeller 43. For example, if impeller 43 is rotating at 2400 RPM, cavity 45 has a radius of 4 inches, the distance from axis 42 to the outlets of nozzles 48 is $10\frac{1}{2}$ inches, the diameter of nozzles 48 is $\frac{1}{2}$ inch, and the diameter of bores 47 is one inch, molten sulfur is typically supplied to atomizer 13 at a rate of 70 gallons per minute. As a result of the controlled sulfur flow rate at less than the maximum discharge capacity of impeller 43, smaller sulfur particles are produced for a given rotational speed and impeller design.

The cooling zone surrounds impeller 43 in adjacent relationship so the molten sulfur is ejected from the outlets of nozzles 48 directly into the cooling zone. The cooling zone is established by air fans and water injection, which are designed to provide sufficient heat dissipation to solidify the molten sulfur as it leaves nozzles 48. Specifically, fans 59 and 63 blow air in an outward direction concurrently with the atomized sulfur ejected from nozzles 48. Assuming impeller 43 is rotating at 2400 RPM and blades 60 and 64 have a width of approximately 2½ inches and an outside diameter of approximately 20½ inches, fans 59 and 63 typically move about 14,000 to 15,000 scfm of air. The cooled, water-vapor-saturated air from chamber 11 is thrown outwardly by fan 63. The molten sulfur elevates the temperature of the air in the cooling zone around impeller 43 above ambient to increase substantially its capacity to absorb water. Preferably, water is injected into fans 59 and 63 by nozzles 75 and 78, respectively, at a controlled rate, e.g., 1 to 2 gallons per minute depending on the humidity, that is low enough to convert all the injected water into water vapor at the elevated temperature (although at ambient temperature, all the water would not be converted to vapor due to the lower vapor pressure), and high enough to provide the heat dissipation required to solidify the sulfur ejected from nozzles 48. In order to maximize the cooling capacity, and thus the rate of sulfur production, it is preferable to saturate or nearly saturate the cooling zone with water vapor. Care is taken, however, that too much water is not injected; otherwise, water droplets are formed and the sulfur particles become undesirably wetted by the injected water. The injected water serves as a vaporizable coolant to dissipate the heat of the atomized molten sulfur by evaporation into water vapor and by the high specific heat capacity of the water itself.

If the enclosure is large enough relative to the rate of sulfur production, water injection may not be necessary to provide sufficient heat dissipative capacity in the cooling zone.

As the molten sulfur is ejected from the outlets of nozzles 48 directly into the cooling zone surrounding impeller 43, it is atomized and rapidly cooled. Preferably, deflectors 55 are oriented so they do not block the passage of air across the outlets of nozzles 48, as impeller 43 spins; specifically, the preferred orientation of deflectors 55 directs the atomized sulfur leaving the outlets of nozzles 48 in a downward pattern in a direction of motion parallel to axis 42, as illustrated in FIG. 2. The combined effect of the air thrown outwardly by fans 59 and 63 including the cooled air from chamber 11, and the water injected into fans 59 and 63 is to rapidly cool the atomized sulfur in the cooling zone around impeller 43 to form solid sulfur particles, i.e., to reduce the surface temperature of the sulfur below its melting point before the sulfur agglomerates appreciably. In other words, the atomized molten sulfur droplets ejected from nozzles 48 are rapidly cooled to form solid sulfur particles before the molten droplets have an opportunity to contact each other. As a result of the surface tension of the atomized molten surface, the solid particles have a smooth, round or pear-shaped configuration. The apparatus is designed so that sufficient cooling is provided to solidify the sulfur before it leaves the cooling zone, i.e., before it falls appreciably out of the influence of fans 59 and 63.

The water vapor is separated from the sulfur particles with the exhaust air in cyclone separator 32. Care is taken that the temperature of the sulfur and air in conduit 31 does not drop sufficiently for condensation of water vapor prior to separation of the water vapor from the sulfur. As a result, a dry, particulate, surface-oxidized sulfur product is conveyed to storage container 33, where it is ready for immediate use without an aging period.

If an aging period is acceptable, more water may be injected into the cooling zone, even though the sulfur particles are then wetted. In such case, the sulfur may have to be aged until the water has evaporated.

The particle size of the sulfur produced in the described manner can be closely controlled over a broad range. The primary control over particle size is exercised by the angular velocity of impeller 43, which typically would vary between 1800 and 3600 RPM. The higher the angular velocity of impeller 43, the smaller is the particle size of the sulfur. Secondary control over the particle size of the sulfur is exercised by varying the extent of protrusion of screws 56 through 58 into the flow path at the outlets of nozzles 48 and/or the percentage rate of maximum discharge capacity at which molten sulfur is fed to impeller 43.

The viscosity of molten sulfur is directly related to its temperature, i.e., at temperatures slightly above its melting point, i.e., 250° F., the viscosity of sulfur is low and it rises rapidly as the temperature increases. This characteristic of molten sulfur is used to advantage in the production of particulate sulfur according to the invention, because low viscosity and, thus better atomization, and low temperature, and thus less heat input, can simultaneously be achieved. Preferably, from the point of viscosity, the temperature of the molten sulfur ejected from atomizer 13 would be in the range of 250° F. to 310° F.; from the point of view of heat dissipation, the temperature would be as close to 250° F. as possible. (In the claims, the term "sulfur at a temperature providing low viscosity" means sulfur at a temperature between approximately 250° F. and 310° F.) This facilitates the rapid cooling of the atomized sulfur to solid particulate form, by minimizing the required heat dissipation, while handling the sulfur near its minimum viscosity.

Production of particulate sulfur in the described manner has a number of distinct advantages over prior art mechanical milling techniques.

First, the operation does not have to be carried out in an inert environment because of the minimal fire danger. Thus, the operation is preferably performed in a normal air environment.

Second, due to the rapid cooling of the sulfur, it does not agglomerate after formation of the particles, and the surface oxidizing gained by the air handling accomplishes the same effect previously gained by aging in a matter of seconds.

Third, the surface of the particulate sulfur is much smoother, rounder, and free of irregularities and corners than the sulfur particles produced by mechanical milling. Consequently, the particulate sulfur does not tend to collect static electric charges, and being smooth and round or pear-shaped, it has better flow and spreading characteristics.

Fourth, it is very easy to alloy or mix other substances, such as surfactants or water repellants with the particulate sulfur produced according to the invention. Surfactants such as Triton X114, alkyl benzene sulfonic acid, and sodium gluconate mixed with a water soluble gum to improve suspend-ability were effectively alloyed with particulate sulfur produced in the manner described above by introduction into the pump pit where it is mixed with the sulfur in molten form. Materials that may be adversely affected by the high temperature of the molten sulfur, may be introduced directly into the vessel of the atomizer by a conduit parallel to conduit 20. It may also be desirable to introduce sulfur particle coating materials such as water repellants in this manner rather than premixing with the molten sulfur.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, instead of mixing air with the sulfur in the atomizer, sulfur could be supplied to the atomizer at its maximum discharge capacity, thus providing a completely closed sulfur system without any air in the atomizer. In this case, all the atomizing and cooling of the sulfur would occur after the sulfur leaves the outlet of the nozzles, the cooling capacity of the apparatus would have to be increased accordingly, and the atomizing force might have to be supplemented. It would be obvious to one skilled in the art to readily recognize that to form certain grades of sulfur particles, conventional, commercially available nozzles could sometimes be used. Other types of sulfur collection systems could be used, such as a conical enclosure with a screw conveyor at its apex or separation of the sulfur by gravity in the enclosure. Further, other techniques could be employed to introduce water into the cooling zone or to create the cooling capacity for the medium in other ways.

What is claimed is:

1. A method of producing particulate solid sulfur comprising the steps of:

atomizing molten sulfur by means of a rotating atomizer that ejects the molten sulfur as particles from its periphery;

forcing air to flow past the periphery of the rotating atomizer concurrently with the sulfur particles ejected by the atomizer to form a cooling zone that surrounds the atomizer;

spraying into the air before the air reaches the atomizer liquid water at a controlled rate that saturates or nearly saturates the air in the cooling zone without forming water droplets in the cooling zone, the rate of sulfur ejection from the atomizer being low enough for the cooling action of air and evaporation of liquid water to cause the molten sulfur particles to solidify; and separating the sulfur as dry solid particles from the air.

* * * * *